United States Patent Office

3,451,659
Patented June 24, 1969

3,451,659
PLANT FOR CONDITIONING FREE-FLOWING
HARDENING MIXTURE
Petr Nikitich Tobolov, ulitsa Uralskikh Rabochikh 62, kv. 13; Jury Arkadievich Kriger, ulitsa 8 Marta 99, kv. 21; Ivan Petrovich Litvinov, ulitsa Ilicha 16, kv. 37; Ismagil Gareevich Bashirov, prospekt Ordzhonikidze 26, kv. 42; and Mikhail Viktorovich Fildshtein, ulitsa Akademicheskaya 11, kv. 54, all of Sverdlovsk, U.S.S.R.
Filed Nov. 8, 1967, Ser. No. 681,383
Claims priority, application U.S.S.R., Nov. 12, 1966, 1,112,845
Int. Cl. B28c 5/14, 5/16; B01f 13/10
U.S. Cl. 259—161                              4 Claims

ABSTRACT OF THE DISCLOSURE

A plant is provided having a horizontal casing into which are fed, in particular manner, components for making casting cores or molds. Mixing shafts are used having blades disposed with a particular helical relationship.

---

This invention relates to plants for conditioning free-flowing hardening mixtures, said mixtures containing frothing agents imparting the requisite flowability to the mixture, and more particularly this invention relates to plants for conditioning free-flowing hardening moulding and core sands used in foundry practice and intended for mixing the main powdered material with dry or liquid binders and hardeners, frothing agents or other substances imparting the requisite flowability to the mixture and with other auxiliary materials giving required technological properties to the mixture. The mixture produced in this manner is employed for making casting cores and moulds by pouring it into a core box or on a pattern.

Known in the art are plants for conditioning free-flowing hardening mixtures comprising a batch mixer whose casing accommodates a horizontal shaft with large-size paddles, hoppers with periodic-action batch feeders for dry components and a periodic-action batch feeder for liquid compound (see, for example, French Patent No. 1,447,983, 1964).

Within a working cycle said periodic-action batch mixers produce one definite-volume batch of prepared mixture, the volume of the batch depending on the mixer capacity and feeder setting. This limits the possibilities of universal employment of said plants in making casting cores and moulds of various sizes and impairs the quality of large-size cores and moulds whose volumes go beyond the mixer capacity, because of local leakages and cold shuts formed at the boundaries between the portions of the poured-in mixture.

The paddle shaft of the mixer in the above plants rotates very slowly (30 to 70 r.p.m.) because of the large size of the paddles. Any attempts to increase the speed of rotation result in heavy wear of these paddles and call for a sharp increase in the power of the drive.

An increase in the mixer capacity intended to step up the plant output brings about an undue increase in the plant dimensions, weight and power requirements.

Besides, the mixture produced by such mixers lacks flowability.

An object of the present invention resides in eliminating the aforesaid disadvantages and providing a conditioning plant for free-flowing hardening mixtures which would ensure a continuous mixture preparation cycle and a continuous output of high-quality mixture in large quantities.

Another object of the invention is to provide a conditioning plant for free-flowing hardening mixtures which would ensure a continuous mixture preparation cycle with a minimum quantity of wastage involved in making various shapes of casting cores and moulds.

Still another object of the invention is to provide a conditioning plant of a simple design, cheap and reliable in operation, with comparatively small dimensions and weight and a low power requirement.

According to the invention, these objects are accomplished by installing one or more shafts of the mixer in an elongated horizontal casing and providing them with paddles arranged helically on each of said shafts so that the imaginary helical surfaces, each essentially coinciding with one of the paddles, have helix angles not exceeding that of said helix and diminishing with the reduction of the distance from the paddles to the output end of the mixer where the discharge hole is located, and installing a baffle plate before said discharge hole in the mixer body, the upper edge of said baffle plate being higher than the shaft axes.

In the preferred embodiment of the plant according to the invention it is practicable to arrange the outlets of the mixers component feeders successively along the mixer; the outlet of the filler feeder should be located at the beginning of the path of the mixture being prepared while the outlets of the hardener and binder feeders should be located at a certain distance from each other to prevent possible contact of the last two components until the filler gas is mixed with one of them.

It is desirable to arrange the outlet of the device for batching and continuous supply of the liquid compound containing the binder or hardener at the end of the path of the mixture being prepared.

It is expedient to provide the plant according to the invention with an automatic control system comprising elements, particularly as time relays, ensuring successive operation of the devices for batching and feeding the mixture components during the starting and stopping of the plant.

An experimental plant for conditioning free-flowing hardening mixtures which has been built according to the present invention and having a height of about 3 m., weight of about 3.5 tons, power input 8.6 kw. ensures continuous preparation of free-flowing hardening moulding and core sands, and turns out 10 m.³/hr. of high-quality mixture.

Now the invention will be described by way of example with reference to the accompanying drawings, in which.

Figure 1:
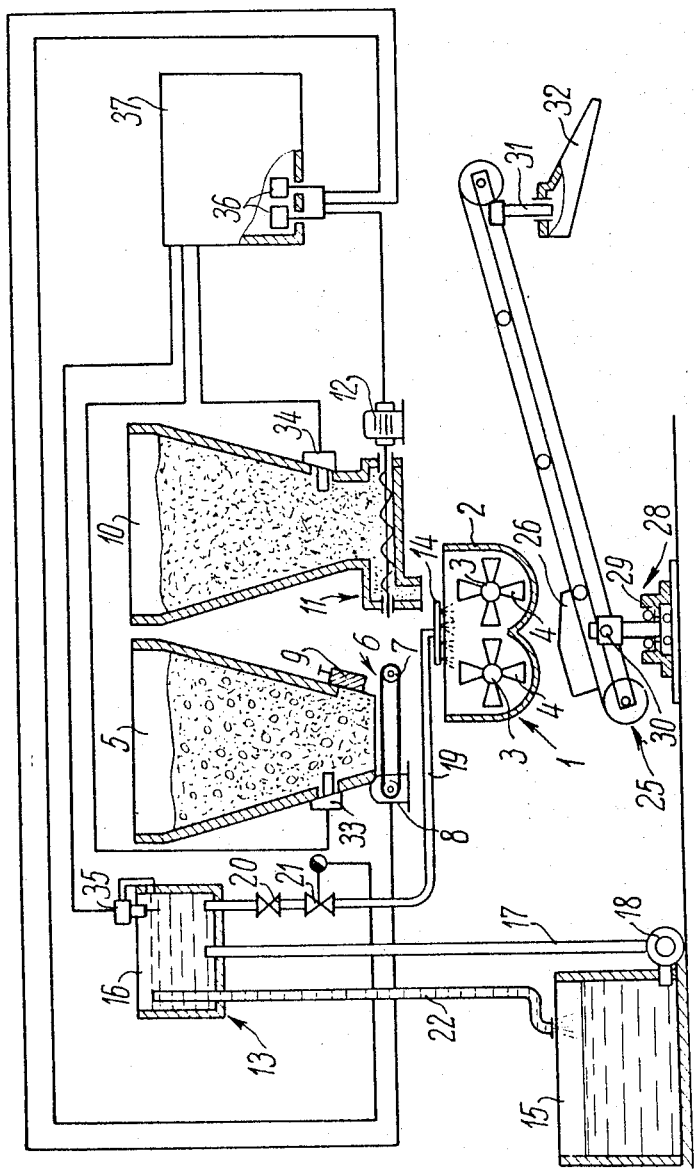
FIG. 1 illustrates an elementary diagram of the plant, front view.
Figure 2:
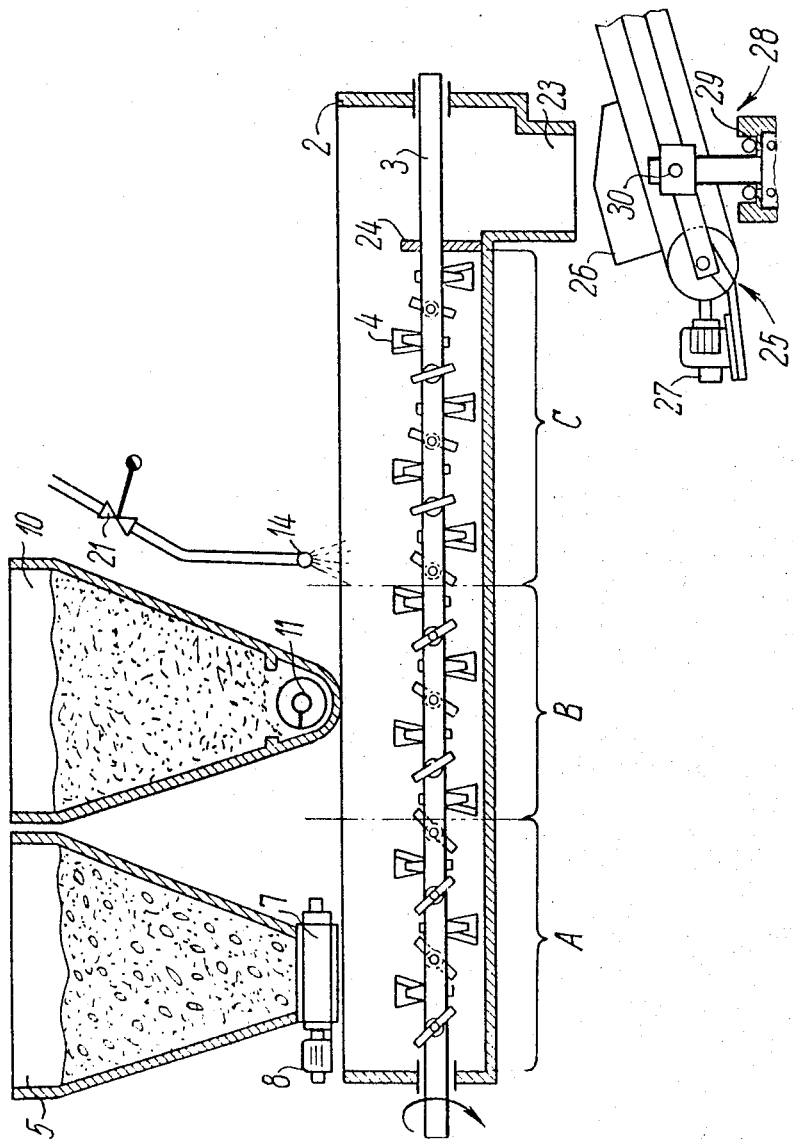
FIG. 2 shows the plant in side view.
Figure 3:
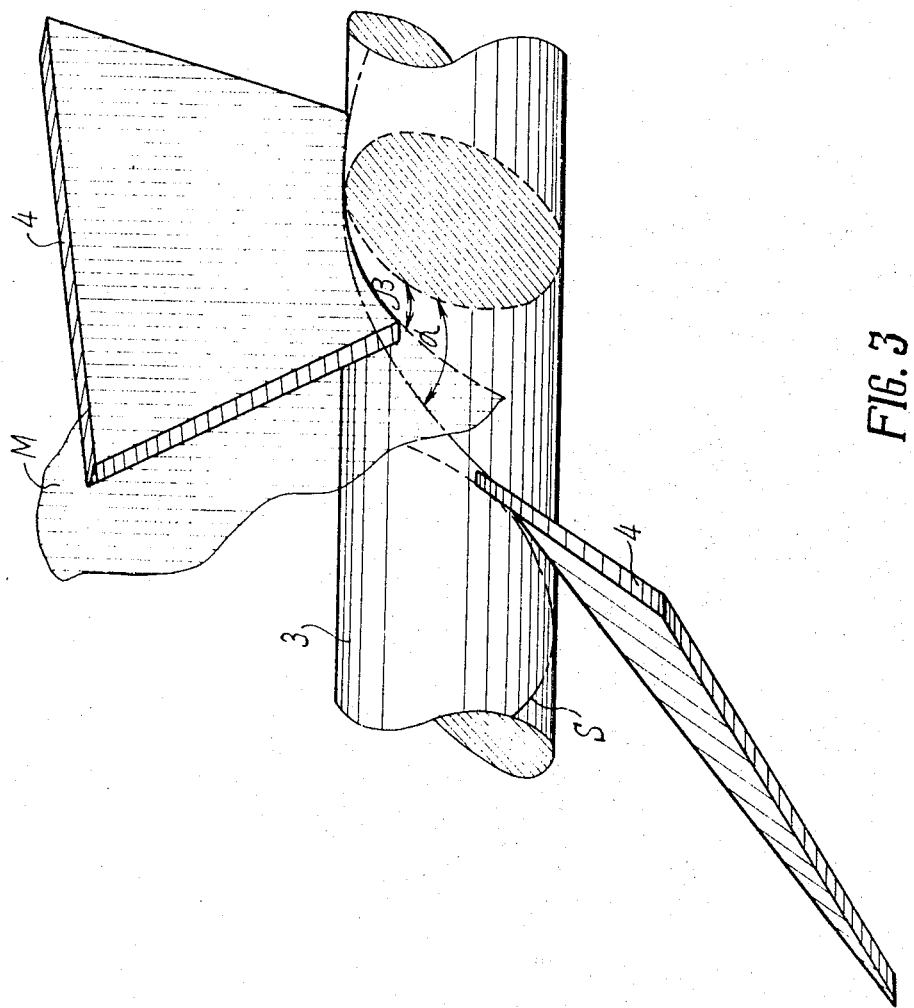
FIG. 3 shows a fragment of the mixer shaft in the axonometric projection.

The plant consists of a mixer (FIGS. 1, 2 and 3) whose elongated horizontal casing 2 accommodates two shafts 3 provided with paddles 4. The shafts are rotated towards each other by an electric gear drive (omitted in the drawing).

Located at the left end of said mixer 1 (FIG. 2) is a hopper 5 with a device 6 for batching and continuous feed of the main dry (bulk) mixture component, that is a filler (sand).

The device 6 comprises a belt conveyor 7 driven by an electric motor 8. The rate of sand feed from the hopper 5 into the mixer 1 is controlled by a shutter 9. Particles of sand fed from the hopper 5 into the mixer 1 are mixed by the paddles 4 and flow along the mixer towards its outlet end.

Installed beside the hopper 5 is another hopper 10 with a device 11 for batching and continuous supply of hardener (slag) said device being made in the form of a screw feeder.

The screw feeder is driven by an electric motor 12. The rate of slag feed from the hopper 10 into the mixer 1 is controlled by changing the rotating speed of the screw feeder.

The slag flowing from the hopper 10 into the mixer 1 and mixing there with sand, continues its movement along the mixer. Installed after the hopper 10 above the mixer 1 is a device 13 for batching and feeding the liquid compound, said device comprising a header 14 through which said compound composed of a binder, a frothing agent and water, is fed continuously into the mixer. Located between the header 14 and the outlet of the screw feeder in the mixer is a gap intended to prevent contact between the hardener (slag) and the liquid compound containing the binder until the dry components (slag and sand) are adequately mixed.

The device 13 for batching and continuous supply of the liquid compound comprises, apart from the header 14, a reservoir 15 and a service tank 16 intercommunicating by means of a pipe 17 through which the liquid is continuously forced by a pump 18 from the reservoir 15 into the service tank 16.

From the service tank 16 the liquid compound flows by gravity into the header 14 through a pipe 19. Said pipe 19 has a cock 20 for adjusting the rate of liquid supply into the mixer while an electrically-operated valve 21 installed below the cock 20 admits the liquid compound intermittently from the service tank 16 into the header 14.

To ensure a constant rate of liquid supply into the mixer, the liquid level in the service tank 16 is kept constant at all time by means of an overflow pipe 22 through which the surplus liquid flows from the service tank 16 back into the reservoir 15.

The paddles 4 (FIG. 3) are mounted on the mixer shafts 3 in a spiral line S being set so that imaginary helical surfaces M, each essentially coinciding with one of the paddles 4, have helix angles $\beta$ not exceeding the helix angle $\alpha$ of said spirals and diminishing with the reduction of the distance from the paddles to the output end of the mixer.

According to the invention, in various embodiments of the mixer the paddles 4 may be flat or otherwise, and may be perforated and fitted with additional elements improving the efficiency of mixing.

The mixer 1 (FIG. 2) is nominally divided into mixing zones A, B, and C within which the angle $\beta$ varies depending on the purpose of the zone in question. In the A zone at the beginning of which the mixer is supplied with the main bulk component, sand, the angle $\beta$ differs but little from the angle $\alpha$. Such an arrangement of the paddle 4 imparts a relatively high speed to the particles of the main material moving along the longitudinal axis of the mixer.

In the B zone, at the beginning of which the mixer is supplied with the additional material, slag, the angle $\beta$ becomes smaller. Here the particles of sand are mixed intensively with the particles of slag and the movement of these materials along the mixer is slowed down.

The pre-mixed dry components enter the C zone at the beginning of which the mixer is fed with the liquid compound. Angle $\beta$ in this zone becomes still smaller than it is, the B zone as a result of which the movement of the mixture along the mixer is still further retarded. The dry components come in contact with the liquid compound and are mixed with it more intensively after which the mixture to be conditioned continues its movement along the mixer. At the end of the C zone a number of the paddles 4 are set so that the angle $\beta$ changes its sign; as a result, the horizontal component of the velocity of the particles moved by these paddles is directed against the flow of the mixture in the mixer.

This ensures the most effective mixing of the pre-mixed components and imparts flowability to the mixture due to intensive catching of air by the paddles, formation of froth bubbles and envelopment by these bubbles of the solid mixture particles.

Located at the output end of the mixer 1, in the lower part of the casing 2 is a discharge hole 23 before which a baffle plate 24 is installed whose upper edge is located higher than the axes of the mixer shafts.

The availability of the baffle plate 24 in front of the discharge hole 23 creates the conditions under which the time of contact between the mixture being prepared and the mixer paddles 4 is increased and the mixture level in the mixer is kept at such a height that the entire surface of each paddle 4 is constantly in contact with the mixture particles during the mixture preparation.

In another possible embodiment of the present invention said baffle plate is installed in front of the discharge hole located on a side wall or end wall of the mixer casing.

A device 25 for dispensing the prepared mixture adjoins the output end of the mixer; said device is made in the form of a conveyor whose receiving end has a hopper 26 for accumulating the conditioned mixture and is mounted under the discharge hole 23.

A conveyor driven by an electric motor 27 is mounted on an articulated foundation 28 whose joints 29 and 30 are so disposed that they allow the conveyor to turn horizontally and vertically with relation to said foundation, the output end of the conveyor moving where desired relative to the mixer 1, while its receiving end together with the hopper 26 for storing conditioned mixture stays all the time under the discharge hole 23 of the mixer 1.

The output end of the conveyor is provided with a hinged support 31 with a tray 32 thereon which can turn in a horizontal plane thus ensuring uniform distribution of the mixture poured into the core box or pattern.

The plant according to the invention is provided with a system of automatic control comprising elements controlling the supply of the mixture components into the mixer, a sand pickup 33 installed on the hopper 5, a slag level pickup 34 installed on the hopper 10 and a liquid compound constant level pickup 35 installed in the service tank 16 as well as elements 36 of the time relay installed on control desk 37 and connected to the electric control circuits of the electric motor 7, electric motor 12 and electrically-controlled valve 21, these elements ensuring successive automatic operation of the devices for batching and feeding the mixture components into the mixer during starting and stopping of the plant, one of said elements controlling the successive starting of these devices and the other controlling their stopping.

We claim:

1. A plant for the conditioning of free-flowing hardening mixtures, mostly employed for making casting cores and moulds comprising containers for dry and liquid components of the mixture, devices for batching and continuous feeding of the mixture components; an elongated horizontal casing having an outlet end with a discharge hole; a continuous mixer comprising at least one shaft rotating in said elongated horizontal casing; paddles arranged along a helix on each of said shafts so that imaginary helical surfaces coinciding with respective of said paddles have helical angles not exceeding the helix angle of said helix and diminishing with the reduction of the distance between these paddles and the outlet end where the discharge hole is located; and a baffle plate installed in front of the discharge hole in the casing, the baffle plate having an upper edge which is higher than the axes of said mixer shafts.

2. A free-flowing hardening mixture conditioning plant according to claim 1 wherein the batching and feeding devices have outlets for a filler, hardener and binder which are arranged successively along the mixer, the outlet for the filler batching and feeding device being located at the beginning of the mixture flow whereas the outlets of the devices for batching and feeding the hardener and binder are spaced from each other to prevent contact between the two last-mentioned components until one of them gets mixed with the filler.

3. A plant according to claim 1 wherein one of the devices for batching and feeding has an outlet for a liquid compound opening into the mixer, said compound containing a binder or a hardener, said outlet being located at the end of the flow of mixture being prepared.

4. A plant according to claim 1 comprising a system for automtaic control comprising a plurality of elements ensuring successive operation of the batching and feeding devices during starting and stopping of the plant.

References Cited

UNITED STATES PATENTS

| 2,826,794 | 3/1958 | Knipp | 259—61 X |
| 2,863,191 | 12/1958 | Dietert | 259—163 X |
| 3,134,579 | 5/1964 | Booth | 259—149 |
| 3,387,829 | 6/1968 | Tadao | 259—161 |

ROBERT W. JENKINS, *Primary Examiner.*

U.S. Cl. X.R.

259—179